United States Patent [19]

Parsen et al.

[11] 4,288,913

[45] Sep. 15, 1981

[54] METHOD OF FORMING IN SITU GELLED ANODE

[75] Inventors: Frank E. Parsen, Irvington; Teresita O. Graham, Dobbs Ferry, both of N.Y.

[73] Assignee: Duracell International Inc., Bethel, Conn.

[21] Appl. No.: 106,995

[22] Filed: Dec. 26, 1979

[51] Int. Cl.³ .............................................. H01M 6/04
[52] U.S. Cl. ................................. 29/623.5; 29/623.1; 429/190
[58] Field of Search .......................... 29/623.5, 623.1; 429/190, 198, 212

[56] References Cited

U.S. PATENT DOCUMENTS

| | | | |
|---|---|---|---|
| 2,993,947 | 7/1961 | Leger | 429/190 |
| 3,261,714 | 7/1966 | Kordesch et al. | 429/190 |
| 3,697,327 | 10/1972 | Croissant et al. | 429/190 |
| 3,871,918 | 3/1975 | Viescou | 429/190 |
| 3,884,722 | 5/1975 | Tucholski | 429/190 |

FOREIGN PATENT DOCUMENTS

| | | | |
|---|---|---|---|
| 54-45746 | 4/1979 | Japan | 429/190 |
| 54-50830 | 4/1979 | Japan | 429/190 |
| 1504183 | 3/1978 | United Kingdom | 429/190 |
| 1504184 | 3/1978 | United Kingdom | 429/190 |

OTHER PUBLICATIONS

Akira Mishina, et al., "γ-Irradiated Starches and Amylose-Acrylamide Graftcopolymers as an Electrolyte Holding Material of Dry Batteries", from *Journal of the Agricultural Society of Japan*, (Nippon Nogei Kaishi), vol. 37, No. 7, Jul., 1963, pp. 389–392.

*Primary Examiner*—Daniel C. Crane
*Attorney, Agent, or Firm*—Ronald S. Cornell; Israel Nissenbaum; Martin M. Glazer

[57] ABSTRACT

A method for forming a gelled anode in which a powdered anode metal is mixed with means for maintaining a uniform mixture of the powdered metal and a gelling agent, the gelling agent is added, and the mixture is fed into an aqueous electrolyte in the cell whereupon a gel is formed in situ.

11 Claims, No Drawings

METHOD OF FORMING IN SITU GELLED ANODE

FIELD OF THE INVENTION

The present invention relates to a method of in situ gelling of the anode with electrolyte of electrochemical cells and a gelling agent, and more particularly to the gelling of the anode and electrolyte in situ through the use of gelling agents which comprise materials capable of absorbing water and means for maintaining a uniform mixture of the anode and the gelling agent during in situ gelling.

BACKGROUND OF THE INVENTION

A thickened or gelled electrolyte is less likely to leak from an electrochemical cell. Many materials have been used as thickening or gelling agents in the past. Such agents include soluble thickeners, insoluble absorbents such as starch, various cellulose type materials such as methyl cellulose, and some synthetic polymers.

A recurring problem with agents used heretofore has been that on standing or during cell discharge, liquid separated from many of the thickened solutions or gels. The liquid was then able to leak out of the cells. Further, during the manufacture of the cells and before the addition of the mixture to the cells, without constant agitation of the mixture, separation often occurred. This in turn resulted in the inaccurate addition of electrolyte due to the random ratios of liquid and gel being added to the cells. The inaccurate addition of electrolyte to the cells in many cases produced poor cells.

Increasing the quantity of agent added to the electrolyte sometimes reduced or prevented this separation, but it also decreased the volume and weight of active material in the cells. The greater quantity of gelling agent also generally decreased the ionic conductivity of the electrolyte which in turn increased the internal resistance of the cells.

Another drawback to the use of some known agents is that they were subject to chemical attack by the strong basic electrolyte solutions employed in alkaline type cells or the acid electrolyte employed in other types of cells. Similarly, some agents also attacked or were attacked by the various components of the cell. The decomposition products resulting from these reactions adversely affected the performance of many cells.

In some cells, a thickener was also added to the anode and/or cathode. Generally, the thickener was similar to that used for the electrolyte. The electrodes were gelled for many reasons depending on the type of cell involved and the results desired.

The use of water-insoluble or water absorbable agents such as those disclosed in U.S. patent application Ser. No. 106,996 filed on even date herewith have not only reduced the above enumerated problems but also unexpectedly improved the discharge capacity of the anode. These agents, even though improving the discharge capacity of cells made therewith do not consistantly form highly uniform gels.

THE INVENTION

In the manufacture of an electrochemical cell comprises of an anode, an aqueous alkaline electrolyte solution, a separator and a cathode, wherein the anode comprises an intimate gelled mixture of a powdered metal, a portion of the aqueous alkaline electrolyte solution and an agent capable of gelling the mixture, where the agent comprises a material capable of absorbing water, a method has now been discovered by which the anode and a portion of the aqueous electrolyte solution can be gelled in situ. This novel method results in the metal powder being substantially uniformly distributed throughout the gel. The method comprises the steps of partially forming a cell in a conventional manner with a cathode and a separator in a container. Then electrolyte is added. Separately, a mixture is made by admixing an active anode metal in powdered form with a means, described more fully below, for maintaining a uniform mixture of the powdered metal and a gelling agent during in situ gelling. Then the gelling agent is added thereto and thoroughly admixed therewith. This mixture is dispensed into the aqueous electrolyte solution in the cell container whereby a uniform gel is formed. The means for maintaining uniformity is a material which will hold the mixture of powdered metal and gelling agent together while the gelling agent is absorbing water, thereby forming a gel in situ, in which gel the metal particles are uniformly distributed.

DESCRIPTION OF THE PREFERRED EMBODIMENT

The preferred means for maintaining homogeneity are liquids which can form a thin adherent film or layer on the surface of the metal particles and/or the particles of gelling agent. The preferred means should be able to form an effective layer of minimum thickness so that very little is required. The preferred means should also be water soluble or miscible so that it does not prevent the aqueous electrolyte solution from contacting the surface of the metal particles. Water insoluble means could form a passivating layer which might interfere with proper cell functioning and discharge. In a most preferred embodiment the additive also imparts some corrosion resistance to the metal particles, thereby reducing cell gassing.

Presently preferred means for maintaining uniformity include liquid polyhydric alcohols. The trihydric alcohols and glycols are preferred with glycerol (glycerine) being most preferred. Most of the polyhydric alcohols have lubricating properties which aid in the substantially homogeneous dispersion of the gelling agent through the powdered metal. They also have some adhesive properties which can aid in holding the particles of metal and gelling agent together when dispersed into the electrolyte solution and during the gelling of the powdered metal and electrolyte solution.

Examples of glycols include ethylene glycol, diethylene glycol, triethylene glycol, polyethylene glycols, propylene glycol, trimethylene glycol, and tetramethylene glycol. Other liquid polyhydric alcohols having chemical and physical properties similar to glycerol are well known in the art and also useful in the present invention.

The effective quantity of means for maintaining uniformity useful in the present invention is unexpectedly quite small, varying from less than 0.1 percent to about 2.5 percent of the weight of the powdered anode metal. The preferred amount is from about 0.1 to 0.4 percent with about 0.25 percent of the weight of the anode metal being most preferred. Use of these small quantities of added material does not significantly decrease the energy density of the cell.

After the powdered metal, the means for maintaining homogeneity, and the gelling agents are substantially homogeneously admixed, a small quantity of water can advantageously be dispersed therein. The effective quantity of water added is also small, and can vary from less than 0.3 percent to about 1 percent of the anode metal weight. The preferred quantity of water used varies, depending on the chemical means for maintaining uniformity. The quantity of water used with the preferred agent, glycerine, is about 0.8 percent of the powdered metal weight.

The gelling agents of the present invention have been disclosed in copending U.S. patent application Ser. No. 106,996, filed on even date herewith which is incorporated herein by reference, and are water-insoluble salts of aqueous, alkali saponified material comprising a gelatinized starch backbone having at least one water soluble side chain grafted thereon. The gelatinized starch and saponified side chains are preferably in molar ratios of from about 1:1 to 1:19. These grafted gelatinized starch materials have the ability to absorb or gel a great quantity, up to more than 1,000 times their own weight, of water. A detailed description and various methods of manufacture of two such preferred agents, having a grafted acrylonitrile or methacrylonitrile side chain are found in U.S. Pat. Nos. 3,935,009, 3,981,100 and 3,997,484 (all Weaver et al.), the entire disclosures of all of which are incorporated herein by reference. Other similar gelling agents are disclosed in U.S. Pat. No. 3,661,815 (Smith). Similar ungelatinized carbohydrate backbone agents are disclosed in U.S. Pat. No. 3,425,971 (Gugliemelli et al.). These further references are also incorporated herein by reference.

Unexpectedly, the use of the process disclosed herein increases the practical discharge capacity of the anode even beyond that of the copending application Ser. No. 106,996 referred to above. In a preferred cell using amalgamated zinc as the anode metal and wherein the gel is formed in situ, upwards of a thirty percent increase in practical anode discharge capacity at high rate is found to occur when the present process is used as compared to prior art cells. It is believed that this is a result of the greater homogeneity of the anode and the increased space between the individual particles of zinc powder in the gelled anode-electrolyte mixture within the cell as compared to the space between the particles when an equal weight of previously used zinc powder electrolyte mixture is thickened or gelled in a conventional manner.

Electrochemical cells having an aqueous electrolyte are subject to internal corrosion and the generation of hydrogen gas. Both are undesirable. Unexpectedly, it has been found that the use of the present invention significantly reduces the production of gas.

In the present invention, the anode is a gelled mixture of the electrolyte solution and a metal in a particulate form. The metal useful in the anode of the present invention can be any metal generally used in cells having an aqueous electrolyte. Such metals can include aluminum, cadmium, calcium, copper, indium, iron, lead, magnesium, manganese, mercury, nickel, tin, zinc and other metals well known in the art, used either alone or in various combinations.

In the preferred cell, the anode metal comprises powdered amalgamated zinc. The preferred anode metal powder is on the order of from about 0.03 to 0.9 millimeter in diameter. The most preferred size of powder to be used depends on many factors and it can be readily determined by one skilled in the art.

The electrolyte solutions which can be gelled by the agents of the present invention include those aqueous electrolyte solutions useful in electrochemical cells. In the preferred embodiments of the present invention alkaline electrolyte solutions are employed. These include, but are not limited to, hydroxides of alkali and alkaline earth metals. Sodium and/or potassium hydroxide are the most commonly used alkaline electrolytes. The agents of the present invention, being stable towards acids, can also be used with acid electrolyte solutions, for example, those employed in the well known zinc-carbon or lead acid battery systems.

The agents and chemical means for maintaining uniformity of the present invention can apparently be used with all cathodes heretofore used in aqueous electrochemical cells. These cathodes include, but are not limited to metal oxides, such as cadmium oxide and hydroxide, mercuric oxide, lead oxide, manganese dioxide, nickel oxide and silver oxide.

A separator can be employed in the present invention between the gelled anode-electrolyte mixture, and cathode. Such separators are similar to those well known in the art and used in various aqueous electrochemical cells. Useful separator materials include, but are not limited, to porous cellulose, plastic and glass materials.

The advantages and efficacy of the present invention are illustrated in the following examples. In the examples and claims all percentages, unless otherwise indicated, are by weight.

EXAMPLE 1

A mixture is made by combining 500 kilograms of amalgamated zinc powder, which is 93 percent zinc and 7 percent mercury with 1.2 kilograms of glycerine (glycerol), then 4 kilograms of water are added, and then 19 kilograms of a powdered gelling agent sold under the trademark SGP145* by Henkel Corporation, Minneapolis, Minn. are added.

*Trademark of Henkel Corporation for a gelling agent which comprises a water insoluble salt of an aqueous, alkali saponified, gelatinized starch polyacrylonitrile graft polymer.

Conventional cell cans are prepared each having a cathode therein of about 40 grams of manganese dioxide, 5 grams of graphite and 5 grams of a 9 N potassium hydroxide solution. A conventional cellulose type separator is added. Then 20 milliliters of an aqueous electrolyte solution, comprising about 35 percent by weight of potassium hydroxide and two percent zinc oxide is added. The electrolyte wets the separator and cathode. About 17 grams of the amalgamated zinc, glycerine, water and gelling agent mixture is then added to the cell can. This mixture sinks through the electrolyte and a homogeneous gel then forms. The manufacture of the cell is completed in a conventional manner.

On standing, liquid does not separate out from the gel, nor does the amalgamated zinc settle out. The density of the gelled mixture is lower than that of a mixture of similar composition using conventional thickeners.

On discharge through a 2.25 ohm resistor to a 0.8 volt cutoff the cell exhibits electrical characteristics similar to those cells made with conventional thickeners such as sodium carboxymethyl cellulose. Unexpectedly, the cell exhibits a higher discharge capacity of about thirty percent, discharging for 17 hours, as opposed to 13 hours for the cell made with sodium carboxymethyl cellulose.

Upon storage of these cells for a period of one to three months at room temperature and at temperatures of 0° C., 45° C., and 75° C., much less hydrogen evolution is evident on storage than with cells not using the SGP 145 agent and glycerine. It is evident that the reduction in gassing permits a reduction in the quantity of mercury normally used in the cell to reduce gassing, because with a system less prone to gassing, less mercury would be needed to achieve any desired rate of gassing.

EXAMPLE 2

A mixture, as in Example 1, is prepared by combining 490 kilograms of amalgamated zinc anode powder, which is 93 percent zinc and 7 percent mercury, with 1.2 kilograms glycerine (glycerol) then with 4 kilograms of water and then with 40 kilograms of an alkali metal carboxylate salt of a saponified starch polyacrylonitrile grafted copolymer made in accordance with the teachings of Example I (copolymer A) of U.S. Pat. No. 3,425,971. The resulting mixture is added to cells as in Example 1.

The resultant gel is similar to and has properties similar to the gel produced in Example 1 but requires more agent to gel the same volume of electrolyte solution used in Example 1. On discharge the cell has electrical properties similar to the cell of Example 1.

EXAMPLES 3–8

Cells are made in accordance with the procedures described in Example 1 but using agents having methyl methacrylate, acrylamide, acrylic acid, N-vinyl-2 pyrolidone, alginic acid, and gluconic acid, respectively, as the side chain grafted onto a gelatinize starch backbone. The grafting is done in a method similar to that shown in the disclosures of Weaver et al. The side chains are ionized in a manner well known in the art. The cells are tested similarly to that in Example 1 and are found to have substantially similar efficacy.

EXAMPLES 9–15

Cells are made in accordance with the procedure described in Example 1 but using ethylene glycol, diethylene glycol, triethylene glycol, polyethylene glycol, propylene glycol, trimethylene glycol, and tetramethylene glycol respectively as the chemical means for maintaining uniformity. The cells are tested similarly to those of Example 1 and are found to have significantly improved discharge capacity when compared to prior art cells.

EXAMPLE 16

Cells are made in accordance with the procedure described in Example 1 but in which about 90 grams of silver oxide is used to replace the manganese dioxide in the cathode. The cells are tested similarly and are found to have equal or better discharge characteristics than similar cells which are made using prior art procedures.

EXAMPLE 17

Cells are made in accordance with the procedure described in Example 1 but in which about 130 grams of mercuric oxide is used to replace the manganese dioxide in the cathode. The cells are tested similarly and are found to have equal or better discharge characteristics than cells which are made using prior art gelled anodes.

The preceeding examples are for illustrative purposes only. It is understood that variations and changes can be made without departing from the spirit and scope of the present invention as defined in the following claims.

What is claimed is:

1. A method for forming a cell having a substantially homogeneously gelled anode comprising the steps of mixing a powdered anode metal with a gelling agent, and with liquid means other than the gelling agent for maintaining, during subsequent gelling, a homogeneous mixture of the powdered metal, said gelling agent and a liquid, said gelling agent being capable of gelling the powdered anode metal when in the presence of an aqueous electrolyte solution; and then dispensing the resulting ungelled mixture into an electrolyte solution in an electrochemical cell, whereby the substantially homogeneously gelled anode is formed in situ.

2. The method of claim 1 wherein said means for maintaining homogeneity is glycerine.

3. The method of claim 1 wherein the means for maintaining homogeneity is mixed with the powdered anode metal prior to admixture with the gelling agent.

4. The method of claim 1 wherein said resulting mixture also contains water.

5. The method of claim 4 wherein said water is present in an amount up to about one percent.

6. The method of claim 1 wherein the means for maintaining homogeneity comprises a liquid polyhydric alcohol.

7. The method of claim 6 wherein the liquid polyhydric alcohol is selected from the group consisting of glycerine, ethylene glycol, diethylene glycol, triethylene glycol, liquid polyethylene glycols, propylene glycol, trimethylene glycol, and tetramethylene glycol.

8. The method of claim 1 wherein the means for maintaining homogeneity is present in an effective amount up to about 2.5 percent of the weight of the powdered anode metal.

9. The method of claim 8 wherein the means is glycerine and is present in an amount of from about 0.1 percent to about 0.4 percent of the weight of the powdered anode metal.

10. The method of claim 1 wherein the gelling agent comprises a carbohydrate backbone having a water soluble side chain grafted thereon.

11. A method for forming a cell having a substantially homogeneously gelled anode comprising the steps of mixing a powdered anode metal with a gelling agent, and with a polyhydric alcohol for maintaining, during subsequent gelling, a homogeneous mixture of the powdered metal, said gelling agent and a liquid, said gelling agent being capable of gelling the powdered anode metal when in the presence of an aqueous electrolyte solution; and then dispensing the resulting ungelled mixture into an electrolyte solution in an electrochemical cell, whereby the substantially homogeneously gelled anode is formed in situ.

* * * * *